(12) United States Patent
Wang et al.

(10) Patent No.: US 10,430,812 B2
(45) Date of Patent: Oct. 1, 2019

(54) RETAIL SALES FORECAST SYSTEM WITH PROMOTIONAL CROSS-ITEM EFFECTS PREDICTION

(71) Applicant: ORACLE INTERNATIONAL CORPORATION, Redwood Shores, CA (US)

(72) Inventors: Z. Maria Wang, Needham, MA (US); Peter Gaidarev, Charlestown, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 907 days.

(21) Appl. No.: 13/901,009

(22) Filed: May 23, 2013

(65) Prior Publication Data

US 2014/0351011 A1    Nov. 27, 2014

(51) Int. Cl.
*G06Q 30/02* (2012.01)

(52) U.S. Cl.
CPC ................. *G06Q 30/0202* (2013.01)

(58) Field of Classification Search
CPC ........ G06Q 10/00; G06Q 40/00; G06Q 40/06; G06F 17/60
USPC ............................................... 705/7.31
See application file for complete search history.

(56) References Cited

U.S. PATENT DOCUMENTS

| | | | | |
|---|---|---|---|---|
| 8,332,864 B2* | 12/2012 | Bose | ...................... | G06Q 10/10 718/106 |
| 2006/0271390 A1* | 11/2006 | Rich | ........................ | G06F 8/20 717/100 |
| 2007/0233621 A1* | 10/2007 | de Souza | ............... | G06Q 10/00 706/11 |
| 2008/0320486 A1* | 12/2008 | Bose | ...................... | G06Q 10/06 718/105 |
| 2010/0169162 A1 | 7/2010 | Anderson et al. | | |
| 2010/0287029 A1* | 11/2010 | Dodge et al. | ................... | 705/10 |
| 2012/0130703 A1* | 5/2012 | Cutts | ................... | G06F 17/5009 703/22 |

(Continued)

OTHER PUBLICATIONS

Irina "Application of ordinary least square method in nonlinear models", 2007, International Statistical Institute, 56th Session, pp. 1-4.*

(Continued)

*Primary Examiner* — Romain Jeanty
(74) *Attorney, Agent, or Firm* — Potomac Law Group, PLLC

(57) ABSTRACT

A system that predicts promotional cross item ("PCI") effects for retail items for a store receives historical sales data for the store and stores the historical sales data in a panel data format. The system then aggregates the stored sales data as a first level of aggregation that is aggregated to the store, a product and a time period. The system further aggregates the first level of aggregation aggregated data as a second level of aggregation that is based on a promotional cross effect attribute ("PCEA") and is aggregated to the store, the time period and a PCEA level. The system derives PCI effect predictor variables from the second level of aggregation and, for each PCEA within a retail item family, forms a regression model. The system then generates estimated model parameters for one or more PCI effects for each PCEA from the regression models.

20 Claims, 2 Drawing Sheets

(56) References Cited

U.S. PATENT DOCUMENTS

| | | | | |
|---|---|---|---|---|
| 2012/0303411 | A1* | 11/2012 | Chen et al. | 705/7.31 |
| 2012/0310705 | A1* | 12/2012 | May et al. | 705/7.31 |
| 2014/0337122 | A1* | 11/2014 | Bansal et al. | 705/14.45 |
| 2015/0112663 | A1* | 4/2015 | Cutts | G06Q 40/04 703/22 |
| 2016/0224914 | A1* | 8/2016 | Cutts | G06Q 40/04 |

OTHER PUBLICATIONS

Muhammad "Business Rules in Software Development", Nov. 2008, Lund University Informatics, pp. 1-72 (Year: 2008).*
R. Blattberg et al.; "How Promotions Work"; Marketing Science; vol. 14 No. 3 Part 2 of 2; 1995; Institute for Operations Research and the Management Sciences; 0732-2399/95/1403/G122$01.25.
H. Van Heerde et al.; "Decomposing the Sales Promotion Bump with Store Data"; Marketing Science; vol. 23 No. 3; Summer 2004, pp. 317-334; ISSN 0732-2399.
I. Hendel et al.; "The Post-Promotion Dip Puzzle: What Do the Data Have to Say?"; The Center for the Study of Industrial Organization; Working Paper # 0057; Dec. 1, 2003.
"An Enterprise Approach to Maximizing Promotion Effectiveness"; An Oracle White Paper; updated Sep. 2006.
S. Macé et al.; "The Determinants of Pre- and Postpromotion Dips in Sales of Frequently Purchased Good"; Journal of Marketing Research; vol. XLI; Aug. 2004; pp. 339-350.
TEC Blog; The Art, Science, and Software behind (Optimal) Retail Pricing—Part 2; Oct. 27, 2009; http://blog.technologyevaluation.com/blog/2009/10/27/the-art-science-software-behind-optimal-retail-pricing-%E2%80%93-part-2/.

* cited by examiner

RETAIL SALES FORECAST SYSTEM WITH PROMOTIONAL CROSS-ITEM EFFECTS PREDICTION

FIELD

One embodiment is directed generally to a computer system, and in particular to a computer system that forecasts retail sales.

BACKGROUND INFORMATION

Retailers frequently initiate promotions and/or marketing campaigns to boost sales and ultimately increase profit. There are many types of promotions that a retailer may initiate depending on the time frame and the type of retail items, including temporary price cuts, price reductions with bundled buys or bonus buys, rebates, etc. Further, the promotions can be advertised in various formats through multiple channels, including an advertisement in a newspaper or a website, coupons and circulars using direct mail, in-store point-of-purchase display, etc.

During a promotion time period, while the sales volume of the merchandise items being promoted are expected to increase, sales of some other items may drop due to the consumer switching their normal purchase to the promoted items in order to get a lower price or an overall better deal. Meanwhile, sales of some merchandise items may actually be affected in a favorable way. For example, promoting hot dogs may increase the sales of hot dog buns.

Therefore, the effect of promotions on sales and revenue is not limited to the promoted merchandise items only, but potentially extends to other merchandise that is not being promoted at the time. For retail merchandising, planning, and revenue management, an accurate sales forecast in the presence of promotions is critical. This type of "promotional cross-item" ("PCI") effect, as a contributing factor to overall sales forecast, should be accounted for correctly.

SUMMARY

One embodiment is a system that predicts promotional cross item ("PCI") effects for retail items for a store. The system receives historical sales data for the store and stores the historical sales data in a panel data format. The system then aggregates the stored sales data as a first level of aggregation that is aggregated to the store, a product and a time period. The system further aggregates the first level of aggregation aggregated data as a second level of aggregation that is based on a promotional cross effect attribute ("PCEA") and is aggregated to the store, the time period and a PCEA level. The system derives PCI effect predictor variables from the second level of aggregation and, for each PCEA within a retail item family, forms a regression model. The system then generates estimated model parameters for one or more PCI effects for each PCEA from the regression models.

DETAILED DESCRIPTION

One embodiment is a computer system that predicts the promotional cross-item ("PCI") effect of retail item promotions in order to generate a retail store forecast. The computer system aggregates data to multiple levels, including a promo cross effect attribute ("PCEA") level, and generates intermediate variables (i.e., data columns), including sales "shock" variables. A regression model then generates model parameters from the intermediate variables, which are used to predict the PCI effect and is then used as an input to a retail sales forecast.

In general, the PCI effect can be categorized into either a "cannibalization" or a "halo" effect. The cannibalization effect refers to the sales decrease of non-promoted merchandise caused by the promotion of another merchandise item; the halo effect refers to the sales increase of non-promoted merchandise due to the promotion of another merchandise item. There are traditionally a few known methodologies employed by retailers to factor in the PCI effect during retail merchandising and planning.

For one, data-driven analytical models have been proposed to forecast merchandise sales in which various model forms include promotional cross-item effects. Examples of such models include the "SCAN*PRO" demand model, disclosed for example in K. Talluri and G. Van Ryzin, "*The Theory and Practice of Revenue Management*", Chapter 5, Springer 2005, the multinomial logit ("MNL") choice-based demand model disclosed in S. Subramanian and H. Sherali, "*A fractional programming approach for retail category price optimization*", Journal of Global Optimization (2010) 48:263-277 ("Subramanian"), and other regression models with variant model formulation, structured econometric models for demand and supply, etc. However, to explicitly account for the PCI effect in these models often requires solving a set of models and a large number of model variables.

For example, although theoretically sound, the "SCAN*PRO" demand model cannot be scaled computationally to account for pair-wise cross-effects for a category of a reasonably large assortment size. This model form therefore cannot be practically implemented in computer system running a software application for large-scale computation. Further, the MNL model can only account for the "cannibalization" effect but not the "halo" effect despite the fact that it simplistically considers elasticity in all merchandise shares as the same.

Further, there are known heuristic methods that the industry applies to estimate cross-item effect during promotions without achieving a high level of accuracy. In one example, merchandise sales are modeled without the cross-item effect and a self-promotional effect is estimated. The cross-item effect is then estimated as a proportion of the self-promotional effect using a practitioner's field experience or simply by using mathematical principals. The accuracy of this type of effect estimation cannot be well measured.

Figure 1:
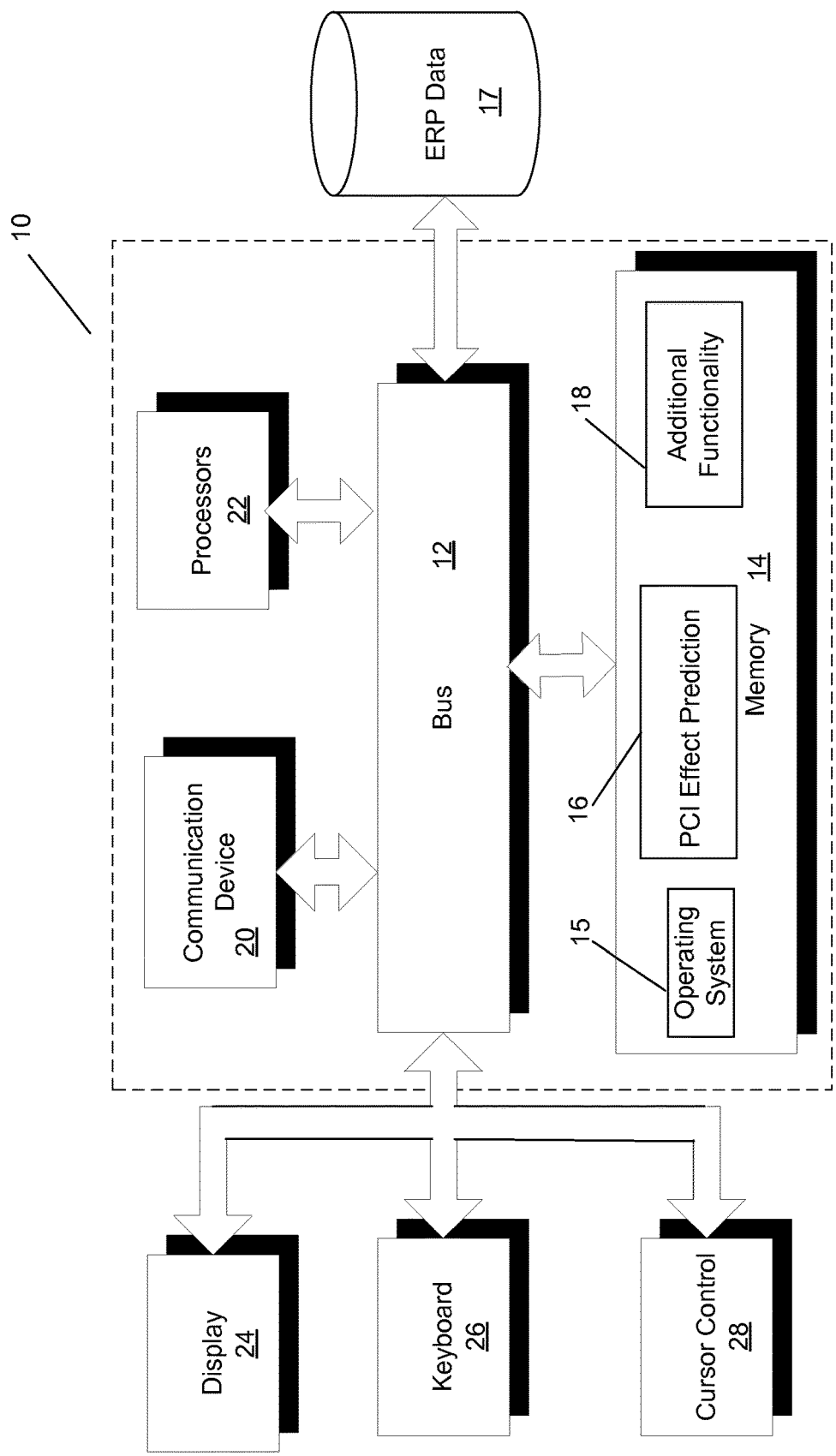
FIG. 1 is a block diagram of a computer system that can implement an embodiment of the present invention.

In contrast to known methodologies, embodiments predict the PCI effect in a computationally efficient, scalable, and analytically accurate manner. FIG. 1 is a block diagram of a computer system 10 that can implement an embodiment of the present invention. Although shown as a single system, the functionality of system 10 can be implemented as a distributed system. Further, all of the elements shown in FIG. 1 may not be included in some embodiments. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a PCI effect prediction module 16 that predicts/estimates a PCI effect for a retail sales forecast as disclosed in more detail below. System 10 can be part of a larger system, such as "Retail Demand Forecasting" from Oracle Corp., which provides retail sales forecasting, or "Retail Markdown Optimization" from Oracle Corp., which determines pricing/promotion optimization for retail products, or part of an enterprise resource planning ("ERP") system. Therefore, system 10 will typically include one or more additional functional modules 18 to include the additional functionality. A database 17 is coupled to bus 12 to provide centralized storage for modules 16 and 18 and store pricing data and ERP data such as inventory information, etc.

In one embodiment, in order to predict a PCI effect for a particular retail store, past historical sales data for the retail store is collected. The data can be in the form of point-of-sale ("POS") data, sales transaction data or customer market-basket data. In one embodiment, a minimum of one year of historical data for the particular retail store being forecast is collected. The data is collected for specific retail products or "Stock Keeping Unit"s ("SKU").

In one embodiment, the data is processed and stored in a panel data format. In general, "panel data" refers to multi-dimensional data. Panel data contains observations on multiple phenomena observed over multiple time periods for the same stores. In one embodiment, the data columns correspond to merchandise attributes, time, and sales and promotion information, and the data rows are the values of the column fields for multiple merchandise items, stores and time periods. In one embodiment, the time period can be a unit of a day or a week.

In one embodiment, the date fields to be collected and/or created for statistical regression include one or more of the following:
  SKU Identifier ("ID");
  Merchandise family ID;
  Fiscal week, month and year;
  Sales volume of the SKU;
  Paid price of the SKU;
  SKU attributes (e.g., BRAND, FLAVOR, SIZE, COLOR);
  A promotion indicator variable. The promotion indicator variable is either 1 or 0 and indicates whether the SKU in the week, given the time unit is a week, was associated with promotion(s) or not;
  Promotion characteristic variables such as promotion duration, promotion type (i.e., promotion techniques used for the SKU/store/fiscal week such as single item price deduction, price percentage off, bundle buys, bonus buys), promotion channel, format and vehicle (e.g., circular, direct mail, end-cap display, meal deal, etc.), or promotion ads features (e.g., first page features, end page features).

In one embodiment, the data is aggregated to an SKU/store/week level (the "first level of aggregation"). Data values of quantifiable columns, such as sales unit and paid price, are averaged per SKU/store/week. For qualitative variables such as promotion type and promotion channel, if there are multiple values for the combination of SKU/store/week, the multiple values can be either grouped as a new variable value, or the value that occurs most frequently is used.

The data fields to be derived at this first level of aggregation are considered "intermediate variables" to be used in a "second level of aggregation", disclosed below. In one embodiment, the first level data fields include the following:
  Promotion counts of SKU/store/week: The sum of the promotion indicator variable of a SKU over store/week (i.e., how many times the SKU was transacted under promotions for any store/week).
  Promotion indicator: The maximum of SKU's promotion indicator at transaction level (i.e., if any transaction of the SKU for the store/week occurs under promotion, its SKU/store/week level indicator is set to 1).
  Average sales price: The averaged paid price of a SKU for any store/week that accounts for both promoted sales and regular (non-promoted) sales.
  Average regular price: The averaged paid price of a SKU for any store/week that accounts for regular (non-promotional) sales only; for the promotional week, a moving-averaged paid price of SKU over the store for the "neighboring" weeks (e.g., two weeks prior to- and 2 weeks post-promotional week) is taken.
  Normalized price: The average sales price normalized (divided) by the average regular price of a SKU for any store/week.
  Average sales: The total sales of the SKU for any store/week that accounts for both promoted and regular (non-promoted) sales.
  Average baseline sales: The total sales of a SKU for any store/week that accounts for the regular (non-promoted) sales only; for the promoted week, a moving-averaged total sales of SKU over store/week is taken.

In one embodiment, the first level of aggregation data is filtered using one or more of the following filter criteria:
  Rows with zero or negative sales volumes are removed.
  Rows with zero or negative average sales prices are removed.
  Rows with normalized prices greater than or equal to 1.2 are removed.
  For the rows for non-promotional weeks (i.e., promotion counts of SKU/store/week equals zero), those with average sales prices beyond three times of standard deviation from the mean are removed.

A second level of data aggregation, after the first level of aggregation to the SKU/store/week level, involves aggregating data to the PROMO CROSS EFFECT ATTRIBUTE ("PCEA"))/store/week level. The PCEA is a merchandise attribute and provides a way of differentiating the products by which the different products likely have a promotional cross effect when one type is on promotion, and can be input by the modeler/analytical consultant, generated by PCI prediction effect module 16 itself, or input by the end user. For example, two brands, one being private label and the other being premium brand, are considered to compete with each other when one of them is on promotion. Therefore, "BRAND" is designated as the PCEA for this example for both brands. Other example PCEAs include "COLOR", "SIZE", or "FLAVOR".

For the second level of data aggregation, in one embodiment three column fields together determine the following data row:

PCEA;

Fiscal week;

Retail store ID.

The data values of quantifiable columns, such as sales unit, price, or promotion discount, are averaged per PCEA/store/week. For the qualitative variables such as promotion type or promotion theme, if there are multiple values for the combination of PCEA/store/week, the multiple values can be either grouped as a new variable value, or the value that occurs most frequently is taken.

One embodiment derives data fields from the second level of data aggregation (i.e., PCEA/store/week) in the form of the predictor variables that are used in predictive models, described below. The data fields/predictor variables include the following:

Normalized Price Index

The normalized price index is the averaged paid price at the PCEA/store/week level divided by the regular price of the same level. The normalized price index is denoted as $\tilde{PI}_{it}$, (i.e., the normalized price for PCEA i during week t). It is derived as $$\tilde{PI}_{it} = \frac{Price_{it}}{\overline{PI}_{it}},$$

where $Price_{it}$ denotes the averaged paid price of PCEA i at week t, and $\overline{PI}_{it}$ denotes the regular price (median price) of the PCEA i during the model training time period.

Aggregate Promotion Indicator

The aggregate promotion indicator is a continuous indicator variable signaling how susceptible the PCEA/store/week is to promotions. The aggregate promotion indicator is denoted as $Prom_{it}$, and it is the averaged promotion indicator rolled up from the SKU/store/week level.

Sales Seasonality Index

The sales seasonality index is the sum of baseline sales across all SKU's being modeled for any store/week. The sales seasonality index is denoted as $SEASON_t$, and it is for week t at the store, common to all PCEA's and week t.

Aggregate Sales

The aggregate sales is the averaged sales rolled up from the SKU/store/week level. The aggregate sales is denoted as $SALES_{it}$ for the aggregate sales of PCEA i and week t

Aggregate Baseline Sales

The aggregate baseline sales is the averaged baseline sales rolled up from the SKU/store/week level. The aggregate baseline sales is denoted as $BL_{it}$ for PCEA i and week t

Sales Shock

For each PCEA/store/week row, there is (n−1) sales shock columns padded as data columns, where n is the total number of PCEA's for the merchandise family at the store. The value of the sales shock variable is the maximum of $(SALES_{it}/BL_{it})$ and 1 so that if sales is greater than the baseline, the division is taken, and otherwise it is 1 (i.e., there is no lift). The sales shock is denoted as $SHOCK_{mt}$ for the PCI effect (i.e., sales shock from PCEA m and week t, m=1, 2, . . . , n and m≠j)

In one embodiment, the second level PCEA aggregate data is filtered using one or more of the following filter criteria:

Rows with zero or negative aggregate sales are removed.

Rows with zero or negative normalized prices indices are removed.

Rows with normalized price indices greater than or equal to 1.2 are removed.

One embodiment uses one or more regression predictive models to predict the PCI effect. One or more of the following variables are used for the predictive models:

$SALES_{it}$: Aggregate sales of PCEA i, week t;

$SEASON_t$: Sales seasonality index of week t;

$\tilde{PI}_{it}$: Normalized price index for PCEA i, week t;

$Prom_{it}$: Aggregate promotion indicator for PCEA i, week t;

$SHOCK_{mt}$: PCI sales shock from PCEA m, week t;

$D_{k,it}$: Set of dummy variables that represent the set of promotional characteristics k available for PCEA i, week t;

$\varepsilon_i$: Residual error term of the model;

$\alpha_i$: Intercept coefficient for fixed-effect of PCEA i;

$\beta_{1,i}$: Price term coefficient (i.e., price elasticity) of PCEA i;

$\beta_{2,i}$: Promo indicator coefficient of PCEA I;

$\gamma_{k,i}$: Coefficients of promotion characteristic k for PCEA i;

$\mu_m$: Coefficient of cross promotion effect from PCEA m.

Predictive Model and Model Form

One or more regression predictive models using a model form with the above predictive variables are used in one embodiment to estimate model parameters and to predict the PCI effect. To model the PCI effect pair-wise among PCEA's (e.g., BRAND's) within a merchandise family of a store, the store sales history data as described above is collected for the merchandise family for a minimum of one year time duration in one embodiment.

The regression model is formulated for predicting a PCEA market share within the merchandise family or retail item family being forecast upon under PCI effects from other PCEA's. In one embodiment the regression model ("model 1"), which models PCEA i market share within the merchandise family at store j is as follows:

$$\ln\left(\frac{SALES_{it}}{SEASON_t}\right) =$$

$$\alpha_i + \beta_{1,i}\ln(\overline{PI}_{it}) + \beta_{2,i}Prom_{it} + \sum_{k=1}^{K}\gamma_{k,i}D_{k,it} + \sum_{m\neq i}\mu_m\ln(SHOCK_{mt}) + \varepsilon_i$$

For each PCEA within the merchandise family, one of the above models is formed. The total number of models needed to predict all PCEA weekly sales under the PCI effects is n, where n is the number of PCEA's within the merchandise family being forecast upon. The models are estimated via Ordinary Least Square ("OLS") to obtain the values of the following model coefficients/parameters: $\alpha_i$, $\beta_{1,i}$, $\beta_{2,i}$ and $\mu_m$.

The model in one embodiment captures the following effects:
PCEA pricing effect.
PCEA self-promotion effect.
Effects from PCEA promotion characteristics: promotion techniques, delivery channel and format, features, etc.
PCI effects from other PCEA promotions.

PCI Effect Prediction

In one embodiment, the model coefficients/parameters estimated from the model form are used to score the new PCEA/store/week data for which forecast of sales and the PCI effects are to be made. Specifically, the forecast data set for the data fields on the right-hand side of the model 1 equation described above are derived and created as described above for the first and second levels of aggregation. Then, in accordance with model 1, the data sets are multiplied by the corresponding estimated parameter variable described above for the predictive models. In this embodiment, it is assumed the error term $\varepsilon_i$ equals zero in order to obtain the values of $SALES_{it}$ and $SEASON_t$, which constitute the forecast term sales/seasonality (i.e., the left-hand side of the model 1 equation +$\varepsilon_i$).

Because the above model is of a multiplicative form, the predicted PCI effect from any PCEA on market share (or sales) of a self PCEA is a multiplicative adjustment factor to be applied on the original market share (or sales) of a PCEA determined as follows:

$$SHOCK_m{}^{\mu_m},$$

where $SHOCK_m$ is the promotional lift of sales of the impacting PCEA, and m and $\mu_m$ is the estimated model parameter for the PCI effect from PCEA m.

PCI Effect Propagation

In the model disclosed above, the PCI effects exist at the high levels of the hierarchy (e.g., BRAND). Frequently, the effects need to be applied at a lower level (e.g., SKU) for determining a sales forecast (for promo-planning purposes the PCI effects might not have to be propagated to such a low level). Since the model is multiplicative in nature, it implies the following:
Cross-effect calculated for a particular PCEA applies equally to all of its lower-level units (e.g., SKU's under the BRAND). If a 10% cannibalization is predicted (i.e., one type of PCI effects) of brand A by a brand B promotion, then all SKUs belonging to brand A should get a 10% downward forecast adjustment for the duration of the brand B promotion.

The same unit can be affected by multiple promotions, which implies that effects are simply multiplied together. Continuing with the above example, if another promotion for brand C is estimated to produce a 3% increase in sales of brand A, so if both are in effect at the same time, brand A (and everything else belonging to brand A) will also get a 3% increase in volume, for a total net effect of (1−0.1)(1+0.03)−1=−7.3% for brand A sales.

Figure 2:
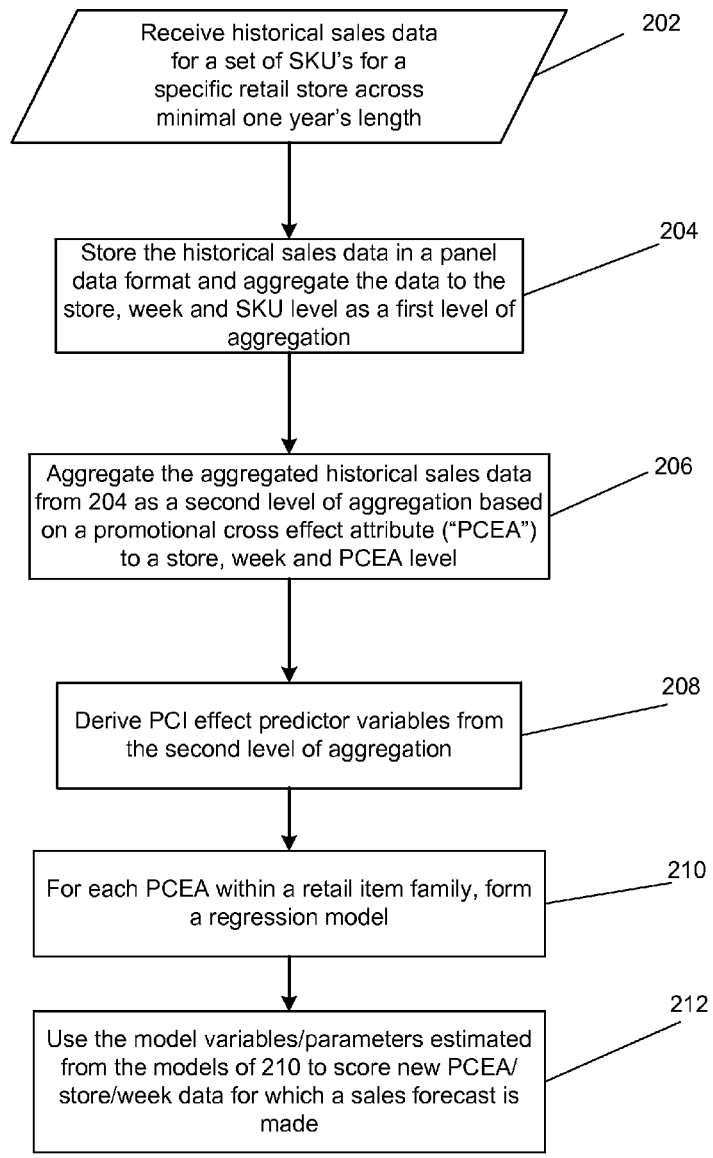
FIG. 2 is a flow diagram of the functionality of the PCI effect prediction module of FIG. 1 when predicting/estimating a PCI effect for a retail sales forecast in accordance with one embodiment.

FIG. 2 is a flow diagram of the functionality of PCI effect prediction module 16 of FIG. 1 when predicting/estimating a PCI effect for a retail sales forecast in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, the historical sales data for a set of SKU's for a specific retail store across a minimal one year's length is received. The historical sales data in one embodiment can include point-of-sale ("POS") data, sales transaction data or customer market-basket data for specific retail items.

At 204, the historical sales data is stored in a panel data format and the data is aggregated to the store, week and SKU level as a first level of aggregation. As a result, intermediate variables are generated.

At 206, the aggregated historical sales data from 204 is aggregated as a second level of aggregation based on a promotional cross effect attribute ("PCEA") to a store, week and PCEA level.

At 208, PCI effect predictor variables are derived from the second level of aggregation. The predictor variables in one embodiment include a sales shock variable $SHOCK_{mt}$. As described above, the value of the sales shock variable is the maximum of ($SALES_{it}/BL_{it}$) and 1 so that if sales is greater than the baseline, the division is taken, and otherwise it is 1 (i.e., there is no lift).

At 210, for each PCEA within a retail item family, a regression model is formed. In one embodiment, model 1 as disclosed above is used as the regression model form. The regression models generate estimated model parameters for multiple PCI effects for each PCEA.

At 212, the model variables/parameters estimated from the models of 210 are used to score new PCEA/store/week data for which a sales forecast is made.

As disclosed, a PCI effect is predicted using a second PCEA level of data aggregation that includes sales shock variables in one embodiment. A regression model form is then used to generate model parameters. In contrast to known systems, the data processing, model building and forecasting processes in embodiments of the present invention are more efficient while being very effective in predicting promotional cross-item ("PCI") effect. Therefore, embodiments enable more expedient software application deployment and business execution on greater data sets for larger business problem solving in retail merchandising, planning and revenue management.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to predict promotional cross item (PCI) effects for retail items for a store, the predicting comprising:
receiving historical sales data for the store;
storing the historical sales data in a panel data format that comprises multi-dimensional data;
aggregating the stored sales data as a first level of aggregation, wherein the first level of aggregation is aggregated to the store, a product and a time period;
aggregating the first level of aggregation aggregated data as a second level of aggregation, wherein the second level of aggregation is based on a promotional cross effect attribute (PCEA) and is aggregated to the store, the time period and a PCEA level;
deriving PCI effect predictor variables from the second level of aggregation;
for each PCEA within a retail item family, forming a regression model, wherein each PCEA comprises a retail item attribute; and
generating estimated model parameters for one or more PCI effects for each PCEA from the regression models;
wherein the PCI effect predictor variables comprise a sales shock variable that comprises a multiplier if sales are greater than a baseline.

2. The computer-readable medium of claim 1, the predicting further comprising:
scoring new store/time period/PCEA level data using the estimated model parameters.

3. The computer-readable medium of claim 2, further comprising generating a sales forecast for the store from the new store/time period/PCEA level data.

4. The computer-readable medium of claim 1, wherein the time period is one week.

5. The computer-readable medium of claim 1, wherein the sales shock variable comprises a maximum of ($SALES_{it}/BL_{it}$) and 1.

6. The computer-readable medium of claim 1, wherein the generating estimated model parameters comprises estimating the regression models using Ordinary Least Square.

7. The computer-readable medium of claim 1, further comprising generating a predicted PCI effect that comprises a multiplicative adjustment factor to be applied on an original market share of a first PCEA, the multiplicative adjustment factor comprising:
$SHOCK_m^{\mu_m}$, where $SHOCK_m$, comprises a promotional lift of sales of the first PCEA, and
m and $\mu_m$ comprise the estimated model parameters for the PCI effect from PCEA m.

8. A method of predicting promotional cross item (PCI) effects for retail items for a store, the method comprising:
receiving historical sales data for the store;
storing the historical sales data in a panel data format that comprises multi-dimensional data;
aggregating the stored sales data as a first level of aggregation, wherein the first level of aggregation is aggregated to the store, a product and a time period;
aggregating the first level of aggregation aggregated data as a second level of aggregation, wherein the second level of aggregation is based on a promotional cross effect attribute (PCEA) and is aggregated to the store, the time period and a PCEA level;
deriving PCI effect predictor variables from the second level of aggregation;
for each PCEA within a retail item family, forming a regression model, wherein each PCEA comprises a retail item attribute; and
generating estimated model parameters for one or more PCI effects for each PCEA from the regression models;
wherein the PCI effect predictor variables comprise a sales shock variable that comprises a multiplier if sales are greater than a baseline.

9. The method of claim 8, further comprising:
scoring new store/time period/PCEA level data using the estimated model parameters.

10. The method of claim 9, further comprising generating a sales forecast for the store from the new store/time period/PCEA level data.

11. The method of claim 8, wherein the time period is one week.

12. The method of claim 8, wherein the sales shock variable comprises a maximum of ($SALES_{it}/BL_{it}$) and 1.

13. The method of claim 8, wherein the generating estimated model parameters comprises estimating the regression models using Ordinary Least Square.

14. The method of claim 8, further comprising generating a predicted PCI effect that comprises a multiplicative adjustment factor to be applied on an original market share of a first PCEA, the multiplicative adjustment factor comprising:
$SHOCK_m^{\mu_m}$, where $SHOCK_m$, comprises a promotional lift of sales of the first PCEA, and
m and $\mu_m$ comprise the estimated model parameters for the PCI effect from PCEA m.

15. A promotional cross item (PCI) effects estimating system that receives historical sales data for the store, the system comprising:
a storage module that stores the historical sales data in a panel data format that comprises multi-dimensional data;
an aggregator module that aggregates the stored sales data as a first level of aggregation, wherein the first level of aggregation is aggregated to the store, a product and a time period, and aggregates the first level of aggregation aggregated data as a second level of aggregation, wherein the second level of aggregation is based on a promotional cross effect attribute (PCEA) and is aggregated to the store, the time period and a PCEA level; and
a regression model module that derives PCI effect estimation variables from the second level of aggregation, for each PCEA within a retail item family, forms a regression model, wherein each PCEA comprises a retail item attribute, and generates estimated model parameters for one or more PCI effects for each PCEA from the regression models;
wherein the PCI effect predictor variables comprise a sales shock variable that comprises a multiplier if sales are greater than a baseline.

16. The system of claim 15, further comprising:
a scoring and forecasting module that scores new store/time period/PCEA level data using the estimated model parameters and generates a sales forecast for the store from the new store/time period/PCEA level data.

17. The system of claim 15, wherein the sales shock variable comprises a maximum of ($SALES_{it}/BL_{it}$) and 1.

18. The system of claim 15, wherein the generating estimated model parameters comprises estimating the regression models using Ordinary Least Square.

19. The system of claim 15, further comprising a generation module that generates an estimated PCI effect that comprises a multiplicative adjustment factor to be applied on an original market share of a first PCEA, the multiplicative adjustment factor comprising:

$SHOCK_m^{\mu m}$, where $SHOCK_m$ comprises a promotional lift of sales of the first PCEA, and m and $\mu_m$ comprise the estimated model parameters for the PCI effect from PCEA m.

20. The system of claim 15, wherein the PCEA comprises a merchandise attribute.

* * * * *